G. A. STEVENS.
CORN SAVING AND CLEANING DEVICE.
APPLICATION FILED MAR. 6, 1914.
1,112,232.
Patented Sept. 29, 1914.
2 SHEETS—SHEET 1.
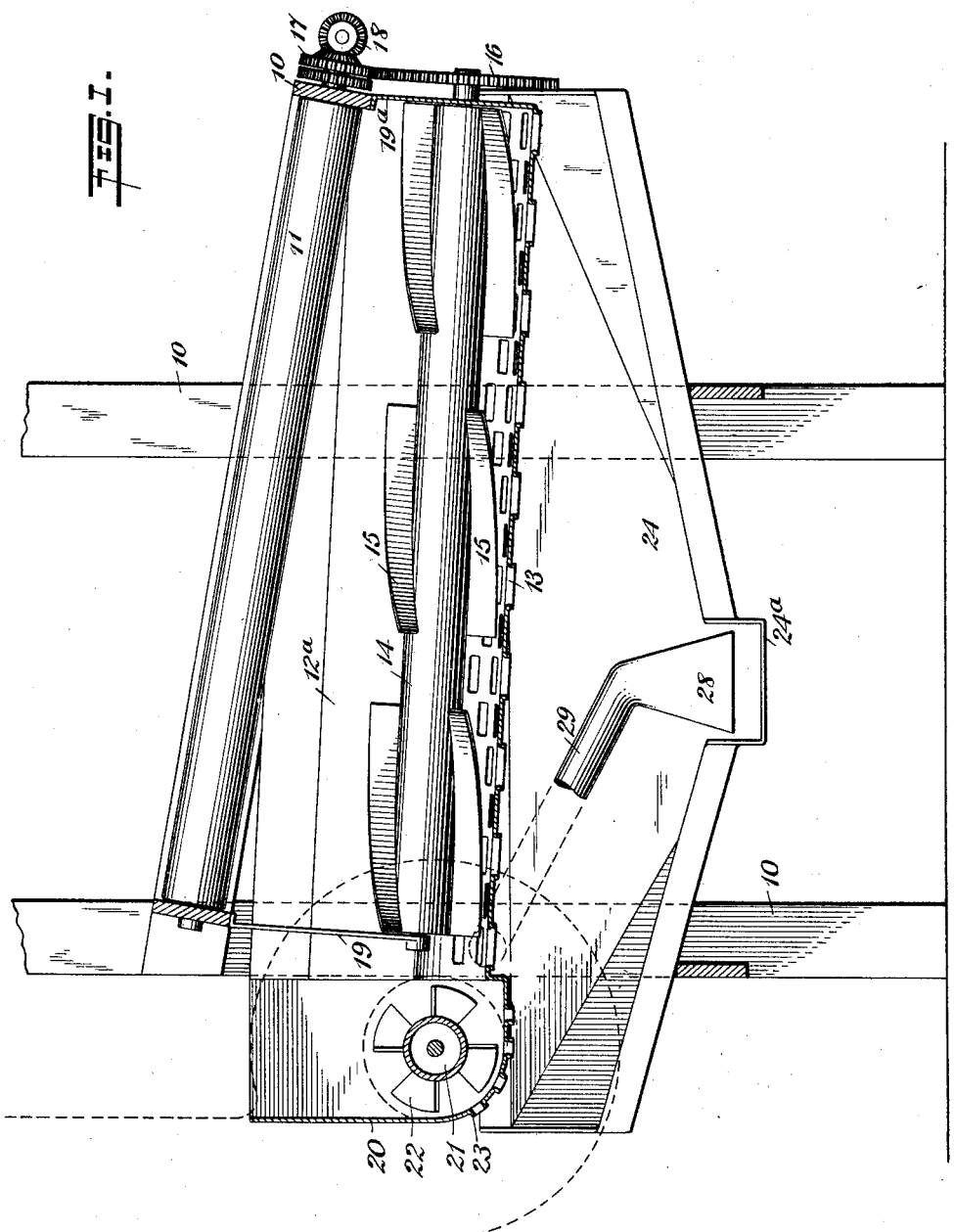
WITNESSES
INVENTOR
George A. Stevens
BY
ATTORNEYS

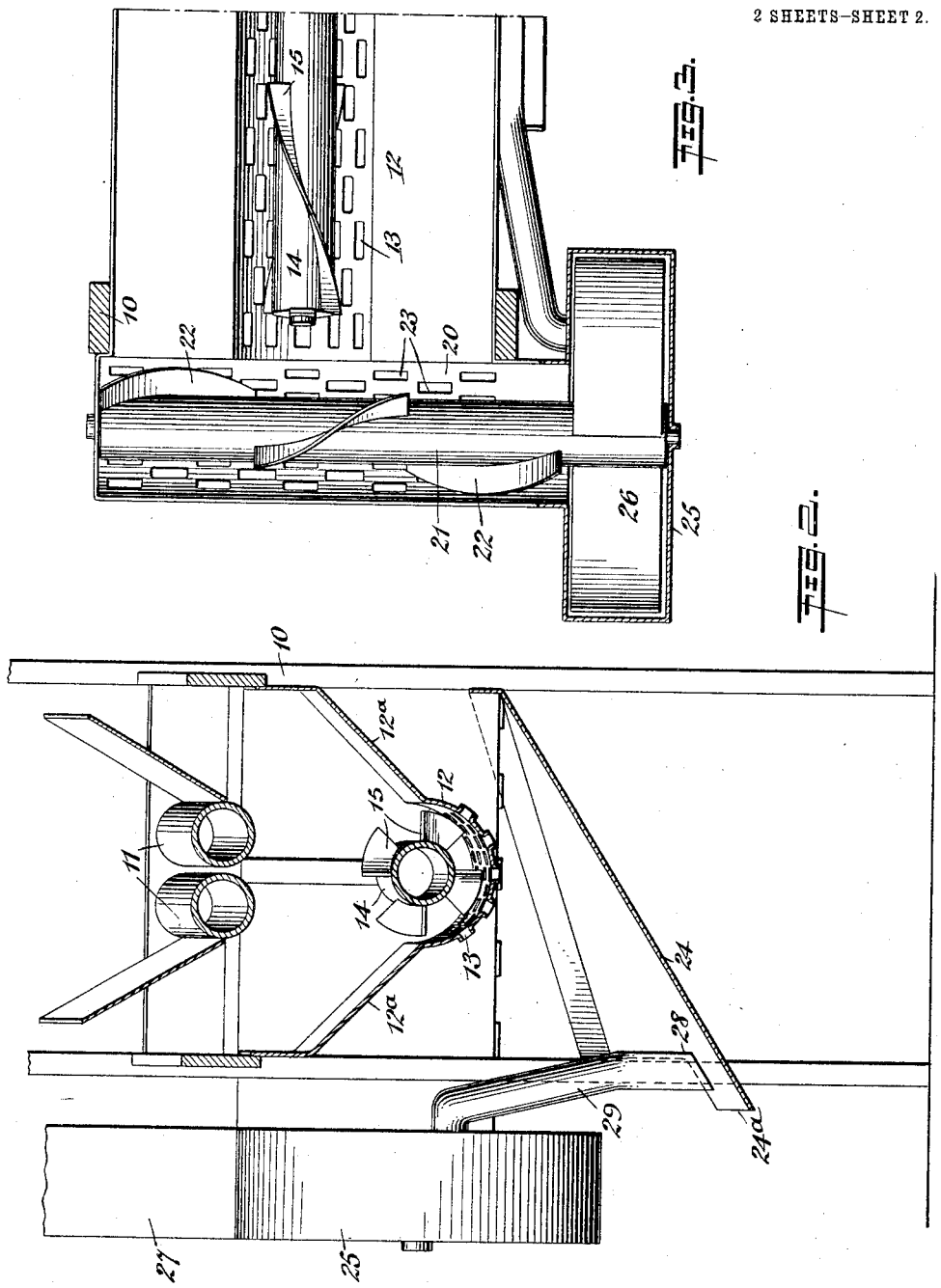

UNITED STATES PATENT OFFICE.

GEORGE ARTHUR STEVENS, OF ELGIN, ILLINOIS.

CORN SAVING AND CLEANING DEVICE.

1,112,232. Specification of Letters Patent. Patented Sept. 29, 1914.

Application filed March 6, 1914. Serial No. 822,870.

*To all whom it may concern:*

Be it known that I, GEORGE A. STEVENS, a citizen of the United States, and a resident of Elgin, in the county of Kane and State of Illinois, have invented a new and Improved Corn Saving and Cleaning Device, of which the following is a full, clear, and exact description.

In the operation of corn husking machines, more or less corn is shelled by the husking rollers and escapes between the rollers, together with husks. Similarly, shelled corn and husks result from the operation of the cutter head or snapping rollers and fall beyond the husking rollers.

My invention relates to means whereby the shelled corn can be saved and collected in clean condition. The fact that the husks and shelled corn are intermingled makes it especially difficult to separate the corn in clean condition and at the same time to effect the quick removal and conveying of the husks.

In carrying out my invention use is made of a screen trough beneath the husking rollers, the trough preferably being inclined and formed of a plate having flanges at the openings. Associated with the trough are agitating and advancing means consisting of a shaft having blade elements so formed and disposed as to intermittently toss the material and also successively advance it to the upper discharge end. A transverse trough screen having outlet openings formed in practice with flanges, receives the husks from the advancing blades of the first shaft and also receives husks and shelled corn direct. A shaft and blades in the second trough deliver the husks to a suction conveyer. A chute beneath the screen troughs receives the shelled corn from both and discharges it. To further separate husk particles and the like from the shelled corn received by the chute, a suction nozzle is arranged at the discharge of the chute and connects with the suction conveyer.

The invention resides in various novel features hereinafter more particularly explained.

Reference is to be had to the accompanying drawings forming a part of this specification, in which similar characters of reference indicate corresponding parts in all the views.

Figure 1 is a longitudinal vertical section of a device embodying my invention, showing the same in connection with parts of the corn husker; Fig. 2 is a transverse vertical section; and Fig. 3 is a partial sectional plan view.

My improved device is applicable in any approved corn husking machine, there being indicated in the drawing, frame members 10. Husking rollers 11 are conventionally indicated. Beneath the husking rollers a screen trough 12 is provided, which is approximately semi-circular in cross section and is provided with wings 12ª at the sides, said wings flaring or being inclined in an outward and upward direction, and secured in any suitable manner at their upper end to members of the frame 10. The outlet openings 13 in the screen are preferably flanged, as shown in Figs. 1 and 2. By forming flanges at the openings, stubble, etc., will readily pass therethrough, whereas unflanged outlets cause material to catch. Associated with the trough or semi-circular screen 12 is a shaft 14, which is provided with blade elements 15, said elements being arranged in spiral series, the elements of each series being disposed on the shaft one in advance of the other and separated by intervening spaces. The described arrangement of the shaft and its blades results in an effective agitation and an advance of the material in the trough from the lower to the upper end of the trough. The blade elements 15 serve to toss the husks upwardly and forwardly, so that the husks are intermittently engaged and thoroughly agitated and loosened. In this way the shelled corn is freed from the husks and the latter are prevented from becoming packed. The thorough loosening of the husks in addition to freeing the grains of corn maintains the material in a proper condition to be taken up and conveyed by a suction conveyer hereinafter referred to.

In the present instance the drive means for the shaft 14 consists of a spur gear 16, which meshes with a spur pinion 17 on one of the husking rollers 11, said pinion being in the present instance in gear with a drive pinion 18. Any other suitable means for revolving the shaft may be employed. The bearings for the shaft in the present example consist of a hanger 19 at one end, and an end plate 19ª at the opposite end of the trough.

It will be observed that a transverse screen trough 20 is arranged at the upper end of the trough 12 and beyond the husking rollers. Thus the said transverse trough will receive the husks delivered by shaft 14 and blades 15, and also it will receive directly husks and shelled corn from the usual cutter head or snapping rollers (not shown). A shaft 21, which with the shaft 14 may be hollow and of pressed steel, is arranged in the transverse trough 20 and is provided with spiral series of blade elements 22 similar to the elements 15. The trough 20 is provided with flanged outlet openings 23 in the bottom for the escape of the shelled corn.

I arrange a chute common to both the screens, said chute being indicated by the numeral 24. The chute inclines in all directions downwardly to a discharge spout 24ª, so that the shelled corn escaping through both screens and also husk particles escaping with the corn will gravitate in the direction of the said discharge spout.

In order to dispose of the husks, a suction conveyer is arranged in connection with the transverse trough 20, comprising a fan casing 25 and the fan 26, here shown as mounted on the transverse shaft 21. The conveying trunk 27 leads upwardly and outwardly to any convenient point from the fan casing. In order to clean the corn and separate it from husk particles escaping with the corn through the screens, I provide means to separate the husk particles and the like and conduct the same to the suction conveyer. Thus a suction nozzle 28 is located adjacent to the discharge spout 24ª of the chute 24 and connects by a pipe 29 with the side of the fan casing. The arrangement is such that as the corn passes out of the discharge spout the accompanying husk particles and the like will be taken in at the nozzle 28, and conducted to the fan casing to be conveyed by the suction conveyer with the husks received from the transverse trough.

By the described construction I am enabled to efficiently separate and clean the corn, and I provide in a compact arrangement of parts for conducting the husks escaping between the rollers and the husks produced beyond the rollers.

The described construction affords a practical means for carrying my invention into effect, and I would state in conclusion that I do not limit myself strictly to the mechanical details herein illustrated, since manifestly the same can be considerably varied without departing from the spirit of the invention.

Having thus described my invention, I claim as new and desire to secure by Letters Patent:

1. In a machine of the character described, an upwardly inclined screen trough approximately semi-circular in cross-section and having wings along the sides, said wings inclining upwardly and outwardly from the trough, a revolving shaft in said trough, formed with spiral series of tossing blades, the blades of a series being disposed in advance of one another and separated by intervening spaces, a transverse screen trough at the upper end of the first trough and receiving material from the latter, means for tossing and advancing the material in the second trough and delivering to the second trough, means for delivering material to be screened to both of said screening troughs and a conveyer to which the material is delivered by the advancing means of the second trough.

2. In a machine of the character described, the combination with feed rollers to feed husks and corn, of a trough beneath the rollers and fed thereby, a second trough transverse to the first trough, beyond one end of the said rollers to receive material falling beyond the rollers, said troughs having openings for escape of shelled corn, means associated with the first trough to agitate the husks and deliver the same to the transverse trough, and means associated with the transverse trough to agitate the husks therein and advance the same toward an end of said transverse trough.

3. In a machine of the character described, the combination with feed rollers, of a screen beneath the rollers to receive shelled corn and husks from the rollers, means for agitating the husks and advancing the same along the trough, a chute beneath the screen for the discharge of the corn escaping through said screen, a suction conveyer, feed means to deliver the husks from the said advancing means to the suction conveyer, a suction nozzle associated with the discharge spout and a connection establishing communication between the said nozzle and the suction conveyer.

4. In a machine of the character described, the combination with feed rollers for feeding husks and corn, of a screen beneath the rollers to receive the material fed thereby, means associated with the screen for agitating the material received thereon and advancing and discharging said material, a chute beneath the screen to catch and discharge the corn escaping through the screen, a suction nozzle adjacent to the discharge spout, a suction conveyer, and connecting means serving to conduct to said suction conveyer husk particles taken in by the nozzle and the husks discharged from the screen by the said advancing means.

5. In a machine of the character described, the combination with feed rollers to deliver husks and corn to be separated, of means for separating the shelled corn and husks delivered by said rollers and for cleaning said corn, said means comprising a screen beneath the rollers, means associated with the screen to agitate the material thereon and advance and discharge the husks, a chute beneath the screen to discharge the shelled corn, means associated with the chute to separate from the corn the husk particles escaping through the screen, a conveying means for the husks and means to conduct to said conveyer the husks from the said separator associated with the chute and the husks discharged by the said advancing means.

6. In a machine of the character described, a screen, means for delivering husks and shelled corn to said screen, means for agitating the material in the trough and for discharging the husks at an end of the trough, a chute beneath the screen to receive and discharge the shelled corn, a suction conveyer, means to convey said discharged husks to said suction conveyer and an inlet in communication with the conveyer and disposed adjacent to the discharge end of the chute, to collect the husk particles escaping from the screen with the shelled corn.

7. In a machine of the character described, the combination with the feeding rollers to deliver husks and corn to be separated, of a screen beneath the rollers, a transverse screen at an end of the first screen beyond the rollers to receive material falling beyond the said feeding rollers, means associated with said first screen to agitate the material therein and advance it to the transverse screen, means associated with the transverse screen to agitate the material therein and advance it along the latter screen, and a chute common to both of said screens and extending beneath the same to receive and discharge the shelled corn that escapes through the said screens.

8. In a machine of the character described, the combination with rolls serving to deliver material to be screened, of screening means beneath the rolls to screen the material delivered by said rolls, a second screening means below the rolls and beyond an end thereof and ranging transversely to the first screening means, means for delivering the tailings from the first screening means to the second screening means, means for advancing material along the second screening means, and means for conveying the tailings from the said second screening means.

In testimony whereof I have signed my name to this specification in the presence of two subscribing witnesses.

GEORGE ARTHUR STEVENS.

Witnesses:
 FRED W. SIMONS,
 W. H. FRANCISCO.

---

Copies of this patent may be obtained for five cents each, by addressing the "Commissioner of Patents, Washington, D. C."